United States Patent
Ben-David et al.

(10) Patent No.: US 7,783,488 B2
(45) Date of Patent: Aug. 24, 2010

(54) REMOTE TRACING AND DEBUGGING OF AUTOMATIC SPEECH RECOGNITION SERVERS BY SPEECH RECONSTRUCTION FROM CEPSTRA AND PITCH INFORMATION

(75) Inventors: Shay Ben-David, Haifa (IL); Baiju Dhirajlal Mandalia, Boca Raton, FL (US); Zohar Sivan, Zichron Ya'akov (IL); Alexander Sorin, Haifa (IL)

(73) Assignee: Nuance Communications, Inc., Burlington, MA (US)

( * ) Notice: Subject to any disclaimer, the term of this patent is extended or adjusted under 35 U.S.C. 154(b) by 1113 days.

(21) Appl. No.: 11/311,753

(22) Filed: Dec. 19, 2005

(65) Prior Publication Data

US 2007/0143107 A1      Jun. 21, 2007

(51) Int. Cl.
G06K 9/00       (2006.01)
G06F 17/27      (2006.01)
G10L 15/00      (2006.01)
G10L 21/00      (2006.01)

(52) U.S. Cl. .................. 704/270; 704/9; 704/231; 704/236; 382/181

(58) Field of Classification Search .......... 704/231, 704/270
See application file for complete search history.

(56) References Cited

U.S. PATENT DOCUMENTS

| | | | |
|---|---|---|---|
| 6,122,614 A * | 9/2000 | Kahn et al. | 704/235 |
| 6,442,519 B1 * | 8/2002 | Kanevsky et al. | 704/243 |
| 6,587,816 B1 | 7/2003 | Chazan et al. | |
| 6,678,655 B2 | 1/2004 | Hoory et al. | |
| 6,725,190 B1 | 4/2004 | Chazan et al. | |
| 7,058,580 B2 * | 6/2006 | Ueyama et al. | 704/270.1 |
| 2001/0005825 A1 * | 6/2001 | Engelke et al. | 704/235 |
| 2002/0138276 A1 | 9/2002 | Damiba | |
| 2002/0141547 A1 | 10/2002 | Odinak et al. | |
| 2002/0147579 A1 * | 10/2002 | Kushner et al. | 704/207 |
| 2002/0169613 A1 | 11/2002 | Damiba | |
| 2002/0184373 A1 | 12/2002 | Maes et al. | |

(Continued)

FOREIGN PATENT DOCUMENTS

WO        WO0289112        2/2002

(Continued)

OTHER PUBLICATIONS

D. Chazan, G. Cohen, R. Hoory and M. Zibulski, "Speech reconstruction from mel-frequency cepstral coefficients and pitch frequency", ICASSP 2000.

(Continued)

*Primary Examiner*—David R Hudspeth
*Assistant Examiner*—Justin W Rider
(74) *Attorney, Agent, or Firm*—Wolf, Greenfield & Sacks, P.C.

(57) ABSTRACT

Methods and systems are provided for remote tuning and debugging of an automatic speech recognition system. Trace files are generated on-site from input speech by efficient, lossless compression of MFCC data, which is merged with compressed pitch and voicing information and stored as trace files. The trace files are transferred to a remote site where human-intelligible speech is reconstructed and analyzed. Based on the analysis, parameters of the automatic speech recognition system are remotely adjusted.

20 Claims, 4 Drawing Sheets

U.S. PATENT DOCUMENTS

| | | |
|---|---|---|
| 2003/0125955 A1 | 7/2003 | Arnold et al. |
| 2004/0015351 A1 | 1/2004 | Gandhi et al. |
| 2004/0044516 A1* | 3/2004 | Kennewick et al. ............ 704/5 |
| 2004/0128124 A1 | 7/2004 | Chazan |
| 2004/0158461 A1 | 8/2004 | Ramabadran et al. |
| 2004/0167773 A1 | 8/2004 | Sorin |
| 2004/0167775 A1 | 8/2004 | Sorin |
| 2004/0172243 A1 | 9/2004 | Ramabadran et al. |
| 2004/0176952 A1 | 9/2004 | Fado et al. |
| 2004/0193407 A1 | 9/2004 | Ramabadran et al. |
| 2004/0193420 A1* | 9/2004 | Kennewick et al. ......... 704/257 |
| 2004/0199381 A1 | 10/2004 | Sorin |

FOREIGN PATENT DOCUMENTS

| | | |
|---|---|---|
| WO | WO03085641 | 4/2003 |
| WO | WO2004066269 | 1/2004 |

OTHER PUBLICATIONS

D. Chazan, G. Cohen, R. Hoory and M. Zibulski, "Low bit rate speech compression for playback in speech recognition systems", EUSIPCO 2000.

ETSI ES 202 211 V1.1.1 DSR Extended front-end feature extraction & Compression, Sections 4, 5, and 8. Available at: http://pda.etsi.org/pda/home.asp?wki__id=G. INmu41×256996AYjCfg.

ETSI ES 202 212 V1.1.1 , DSR Extended advanced front-end feature extraction & Compression, Sections 5, 6, and 10. Available at: http://pda.etsi.org/pda/home.asp?wki__id=ifebhT1rfnCDJEFImD99t.

* cited by examiner

REMOTE TRACING AND DEBUGGING OF AUTOMATIC SPEECH RECOGNITION SERVERS BY SPEECH RECONSTRUCTION FROM CEPSTRA AND PITCH INFORMATION

BACKGROUND OF THE INVENTION

1. Field of the Invention

This invention relates to automatic speech recognition. More particularly, this invention relates to remote tuning and debugging of automatic speech recognition systems.

2. Description of the Related Art

The meanings of certain acronyms and terminology used herein are given in Table 1.

TABLE 1

| ASR | automatic speech recognition |
|---|---|
| DCT | discrete cosine transform |
| FFT | fast Fourier transform |
| MFCC | Mel-frequency Cepstral coefficients |
| STFT | short time Fourier transform |

Automatic speech recognition systems usually need tuning or debugging after they are installed on a server at a customer site. In typical scenarios, voice servers process thousands of audio calls a day. During operation, trace files are generated for later analysis. Recordings of audio data dominate the trace file size. A typical installation, even in a ramp-up stage can easily generate gigabytes of trace data per day. Support teams are currently limited in their ability to analyze meaningful amounts of trace data because transferring such volumes of data is prohibitively expensive and inefficient. While it would be desirable to undertake daily analysis of trace data at a remote site to avoid the expense of dispatching support personnel to a customer site, in practice, limitations on the transfer of the trace data prevent this. Accordingly, tuning and debugging of automatic speech recognition systems remains slow and expensive.

SUMMARY OF THE INVENTION

An embodiment of the invention provides a computer-implemented method for maintaining automatic speech recognition systems, which is carried out by receiving audio input speech signals, using a first automatic speech recognition system to extract acoustic information from the speech signals, including recognition features, compressing the acoustic information. The method is further carried out thereafter by transmitting the compressed acoustic information to a remote site, and at the remote site decompressing the compressed acoustic information to obtain decompressed recognition features, evaluating a second automatic speech recognition system using the decompressed recognition features, and responsively to the evaluation of the second automatic speech recognition system, adjusting the first automatic speech recognition system.

A further aspect of the method is carried out at the remote site by reconstructing the speech signals from the decompressed recognition features, listening to the reconstructed speech signals by a human, and obtaining a human interpretation of the reconstructed speech signals. The evaluation of the second automatic speech recognition system is conducted by comparing an output of the second automatic speech recognition system with the human interpretation.

In one aspect of the method, extracting acoustic information includes extracting pitch information from the speech signals, and compressing the acoustic information includes compressing the pitch information to obtain compressed pitch data. Decompressing the compressed acoustic information includes decompressing the compressed pitch data, and the speech signals are reconstructed using the decompressed pitch data and the decompressed recognition features.

Another aspect of the method is carried out by combining the compressed acoustic information and the compressed pitch data into a common output stream, storing the output stream in a data repository, and thereafter reading the output stream from the data repository. Transmission to the remote site is performed using the read-out from the data repository.

According to an additional aspect of the method, extracting pitch information includes generating a fast Fourier transform of the speech signals.

In yet another aspect of the method, compressing the acoustic information is performed by vector quantization.

In still another aspect of the method, compressing the acoustic information includes encoding Mel-frequency Cepstral coefficients.

According to one aspect of the method, adjusting the first automatic speech recognition system is performed by accessing the first automatic speech recognition system from the remote site.

An embodiment of the invention provides a computer software product for maintaining an automatic speech recognition system, including a computer-readable medium in which computer program instructions are stored, which instructions, when read by a computer, cause the computer to receive audio input speech signals, to extract features from the speech signals that are indicative of content of the speech signals, and to compress the features, The instructions thereafter cause the computer to transmit the compressed features to a remote site, and responsively to a transmission of the compressed features, to receive corrected parameters for the automatic speech recognition system from the remote site, and to reconfigure the automatic speech recognition system using the corrected parameters.

An embodiment of the invention provides an automatic speech recognition system including a processor operative to receive audio input speech signals, to extract features from the speech signals that are indicative of content of the speech signals, to extract pitch data from the speech signals, to compress the features, to compress the pitch data, and thereafter to transmit the compressed features and the compressed pitch data to a remote site. The processor is operative, following transmission of the compressed features, to receive corrected parameters for the automatic speech recognition system from the remote site and to reconfigure the processor with the corrected parameters.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Overview

Figure 1:
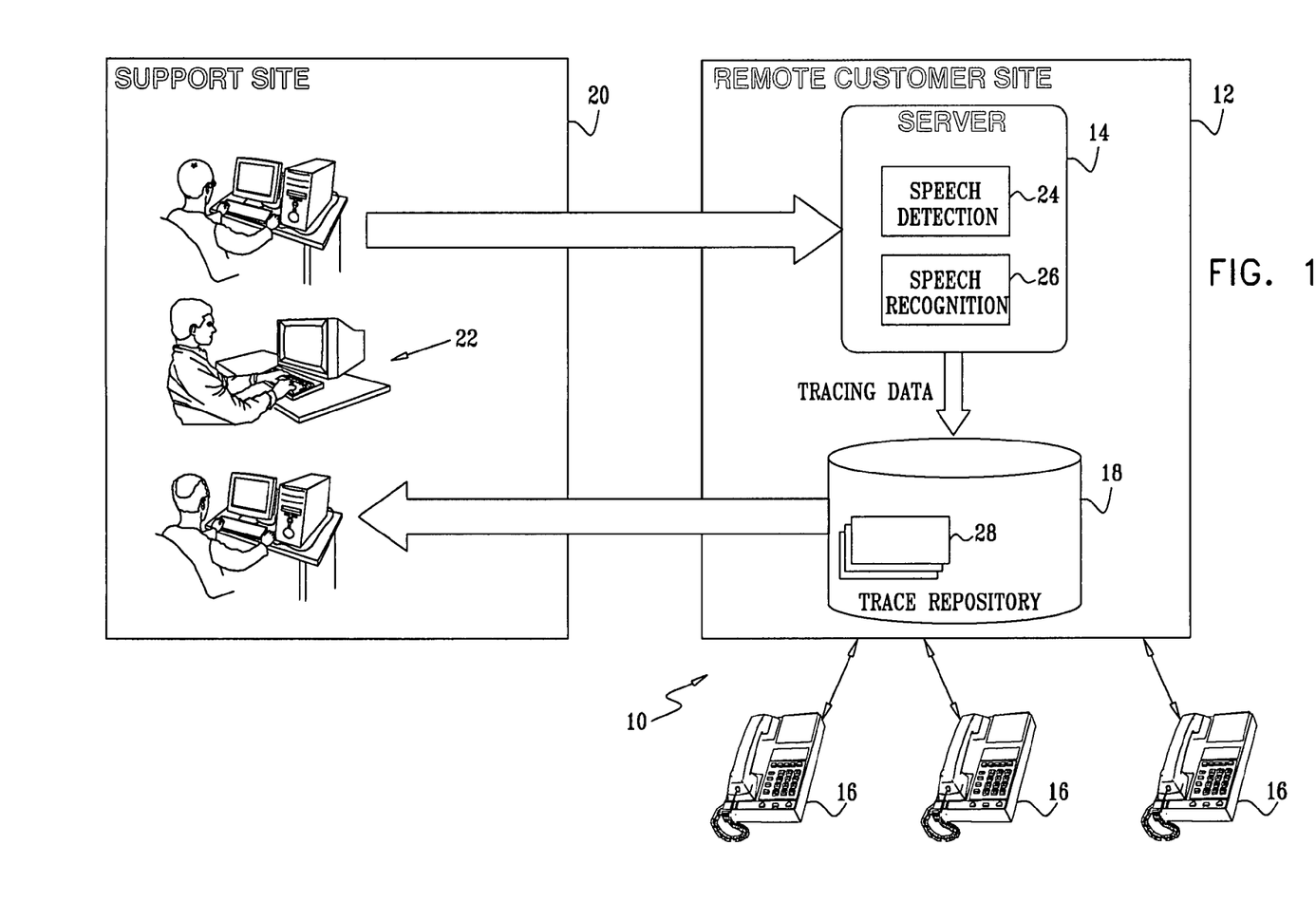
FIG. 1 is a block diagram illustrating an automatic speech recognition system according to a disclosed embodiment of the invention.

Reference is now made to FIG. 1, which is a block diagram illustrating an automatic speech recognition system 10 according to a disclosed embodiment of the invention. The system 10 extracts necessary information from received voice data, compresses and packages it efficiently, and transfers it for off-site speech reconstruction and analysis using the extracted information. The system 10 typically comprises one or more general-purpose or embedded computer processors, which are provided with memory and programmed with suitable software for carrying out the functions, described hereinbelow. Thus, although elements of the system 10 are shown below as comprising a number of separate functional blocks, these blocks are not necessarily separate physical entities, but rather represent different computing tasks. These tasks may be carried out in software running on a single processor, or on multiple processors. The software may be provided to the processor or processors in electronic form, for example, over a network, or it may be furnished on tangible media, such as CD-ROM or non-volatile memory. Alternatively or additionally, the system 10 may comprise a digital signal processor (DSP) or hard-wired logic.

At a site 12 located in the field, e.g., at a customer site, a speech recognition server 14 is linked to any number of users 16 via communications channels, e.g., telephone lines, wireless links, and data networks. In any case, the users 16 interact vocally with the server 14. Speech of the users 16 is stored in a trace repository 18, as described below. The server 14 includes a speech detection module 24, which trims speech from surrounding silence, and a speech recognition engine 26.

Tuning and debugging of the system 10 is not done in the field, but rather at a remote support site 20, which receives trace and logging data files from the trace repository 18. This data is then used to analyze problems. A remote support team 22 then debugs and tunes system parameters. More particularly, the team 22 debugs the parameters of the speech detection module 24, and the speech recognition engine 26. The parameters of the speech recognition engine 26 are typically embodied in a language model and an acoustic model. The invention is applicable to generic speech recognition systems. Thus, the speech detection module 24 and the speech recognition engine 26 can incorporate language models and acoustic models in many combinations.

As explained in further detail below, input speech features are compressed transparently in order to transfer data from the site 12 to the support site 20 in a feasible time interval. As used herein, the phrase "compressed transparently" means that the difference between ASR accuracy obtained using the speech features after compression and subsequent decompression, and the ASR accuracy obtained using the original speech features is statistically insignificant. In other words, transparent compression followed by ASR processing after decompression does not significantly affect the ASR result. As noted above, compression is required in order to reduce the size of the transferred data sufficiently to transfer it to a remote site in a feasible time period. Transparent compression is desirable so that the debugging team can reproduce substantially the same ASR results at the remote site as would be obtained at the client site.

Low bit-rate compression of speech, which is transparent to the ASR system, is known in the art. This type of compression algorithm is based on compression of the features extracted by an ASR engine and used for speech recognition. One example of such a compression scheme is generally described in the document Low Bit Rate Speech Compression for Playback in Speech Recognition Systems, Chazan, D., et al., in Proc. European Signal Processing Conference, EUSIPCO 2000 (also available on the Internet at the URL "http://www.haifa.il.ibm.com/projects/multimedia/recovc/"). Another example is described in the documents ETSI ES 202 211 V1.1.1 (2003-11) and ETSI ES 202 212 V1.1.1 (2003-11), both available from ETSI, 650 Route des Lucioles, F-06921, Sophia Antipolis Cedex, FRANCE.

Compressed trace files 28 based on input speech from the users 16 are generated by the system 10 and stored in the trace repository 18. These files are prepared by extracting features from speech signals that are indicative of the speech content and by extracting pitch information from the speech signals. The two are compressed and combined, as explained in further detail hereinbelow. In one embodiment the features are Mel-frequency Cepstral coefficients (MFCC); however many type of speech feature extraction schemes known in the art can be used. The files 28 are transferred from the server 14 to the support site 20 for speech reconstruction, analysis, tuning and debugging. The compressed files are small enough that they can be feasibly transferred to the support site using conventional communications technology. The compression techniques employed comply with the following requirements: (1) capability for machine speech recognition must remain virtually unaltered when working with the compressed speech, and (2) the compressed information must be decodable to yield human-intelligible speech. The first requirement is needed in order for the support site to reproduce issues encountered in the field. The second requirement is needed to allow the support team to understand what was said.

Audio File Compression

Figure 2:
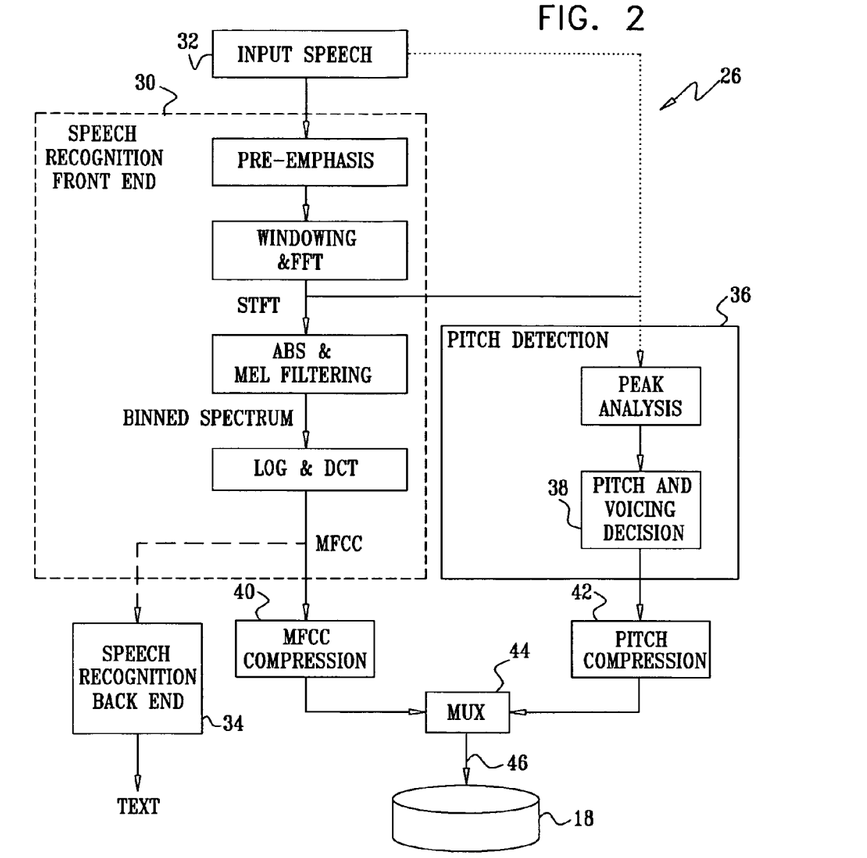
FIG. 2 is a detailed block diagram of a speech recognition engine in the automatic speech recognition system shown in FIG. 1, which is adapted to produce compressed trace files in accordance with a disclosed embodiment of the invention.

Reference is now made to FIG. 2, which is a functional block diagram of the speech recognition engine 26 (FIG. 1), which is adapted to produce compressed trace files in accordance with a disclosed embodiment of the invention. The speech recognition engine 26 is exemplary. The invention can be practiced with many speech recognition engines and compression schemes, and is not limited to the particular embodiment described herein.

The speech recognition engine 26 includes a front-end 30, which receives input speech 32 as a time-domain signal and transforms it to a sequence of recognition feature vectors. According to one embodiment, modules of the front-end 30 are employed for computation of Mel-frequency Cepstral coefficients (MFCC) in transforming the input speech 32.

MFCC are recognition features well known in the speech recognition art. The speech recognition engine 26 also has a back-end 34, which typically converts the transformed input speech signal into text. The invention is not limited to MFCC data, and can be practiced with other Cepstral variants. Other signal processing schemes that do not use Cepstral data can also be used provided that they satisfy the two requirements described above.

Several functions are performed in the front-end 30, including pre-emphasis, windowing and fast Fourier transform (FFT) operation, calculation of absolute values, Mel filtering, log and DCT operations, all of which are known in the art. A suitable engine for use as the speech recognition engine 26 is generally described in the above-noted document Low Bit Rate Speech Compression for Playback in Speech Recognition Systems, and in commonly assigned U.S. Patent Application Publication No. 2003/0088402.

Figure 3:
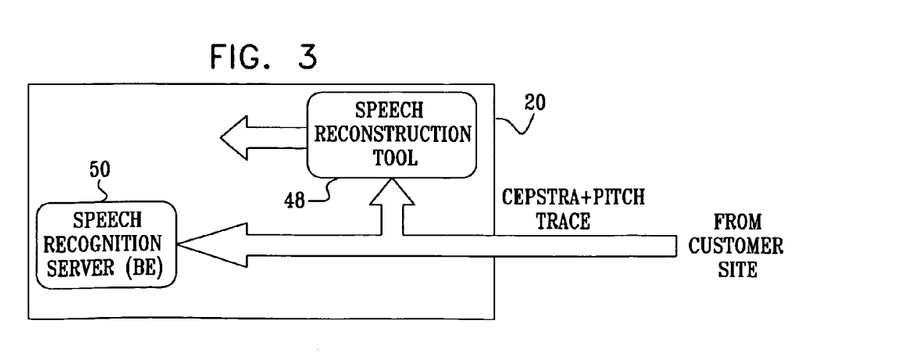
FIG. 3 is a high level block diagram of a remote site having a speech reconstruction tool to support the automatic speech recognition system shown in FIG. 1, in accordance with a disclosed embodiment of the invention.

Pitch information is extracted from the input speech 32 in a pitch detection module 36. The pitch detection module 36 can be constructed in accordance with the teachings of commonly assigned U.S. Pat. No. 6,678,655, U.S. Patent Application Publication Nos. 2004/0128124, 2004/0167773, 2004/0167775, and further in accordance with U.S. Patent Application Publication Nos. 2004/0193407, 2004/0172243 and 2004/0158461. Briefly, the result of a short time Fourier transform (STFT) is fed to a peak analyzer, which analyzes spectral peaks. In the embodiment of FIG. 3, the STFT result is taken from the front-end 30. Alternatively, the STFT can be applied to the time domain signal taken from the input speech 32 in the pitch detection module 36, as shown in FIG. 2 by a broken line connecting the input speech 32 with the pitch detection module 36. The frequency and amplitude of every peak are computed and form a line spectrum. A pitch detection and voicing decision unit 38 uses this data to decide whether the speech frame is voiced or unvoiced. If it is voiced, the pitch detection and voicing decision unit 38 determines the pitch period. The decisions are based on assigning each pitch candidate a confidence level, e.g., a number between 0 and 1, which quantifies the confidence that a given line spectrum was generated with a particular pitch. If the confidence level of all candidates is too low, the frame is considered to be unvoiced. Otherwise, simple rules depending on the confidence level, the pitch value and pitch values from previous frames are applied to select the best pitch candidate. Other pitch detection algorithms known in the art may also be used, provided their accuracy level is high enough.

MFCC data is output as feature vectors of 13 dimensions by the front-end 30 and compressed, as explained in the above-referenced document Low Bit Rate Speech Compression for Playback in Speech Recognition Systems, in a MFCC compression block 40. In this embodiment, a 4.0-6.0 Kbps compression scheme is employed, which does not impair recognition rates.

Other compression algorithms, including vector quantization, may be used in the block 40, for example, as described in the above-noted documents ETSI ES 202 211 V1.1.1 (2003-11) and ETSI ES 202 212 V1.1.1 (2003-11). Indeed, many compression schemes may be used, provided that they yield sufficient recognition accuracy.

The output of the pitch detection module 36 contains pitch and voicing information. This is compressed in a pitch compression block 42, as described in the above-referenced document Low Bit Rate Speech Compression for Playback in Speech Recognition Systems. Pitch compression is carried out by a uniform quantizer, which spans a variable range of pitch values. The range of the quantizer is determined by the quantized pitch and voicing decision of previous frames. A specific code is allocated for an unvoiced frame. A bit rate of 500 bps is obtained with this scheme for carrying pitch. Other pitch compression algorithms may be used in the block 40, for example, as described in the above-referenced documents ETSI ES 202 211 V1.1.1 (2003-11) and ETSI ES 202 212 V1.1.1 (2003-11).

The streams of the compressed MFCC feature vectors and the compressed pitch are multiplexed together in a multiplexer 44, to form a combined output bitstream 46 for storage in the trace repository 18.

It should be noted that the output of the pitch detection module 36 is not forwarded to the back-end 34. The functions of the back-end 34 are therefore unaltered. In modes of operation where tracing and debugging are not performed, the pitch detection module 36 and the compression modules corresponding to blocks 40, 42 can be disabled.

It is to be emphasized that the above-described technique is transparent in terms of the speech recognition process, thus allowing analysis of the trace information under optimal conditions. The compression techniques described above yield nearly a three-fold improvement in the compression ratio as compared to naive solutions. An exemplary naive solution would encode the input speech with some standard voice encoder, such as GSM-AMR. This would result in human-intelligible speech, but machine recognition aspects of the encoded speech would be altered, which would prevent optimal debugging. In addition it is known that tuning ASR systems using modified speech is suboptimal. Thus, in order to meet the first above-stated requirement, speech feature information must also be saved.

Speech Reconstruction

Reference is now made to FIG. 3, which is a block diagram of aspects of the remote support site 20 (FIG. 1), in accordance with a disclosed embodiment of the invention. A speech reconstruction tool 48 converts a compressed file back to human-intelligible speech, as explained in further detail hereinbelow. Typically the compressed file is received from the trace repository 18. Decompressed Cepstral data are fed directly to the back end (BE) of a speech recognition engine 50 for debugging, or adaptation of the models. Typically, the speech recognition engine 50 duplicates the speech recognition engine 26 (FIG. 1). The front end of the speech recognition engine 50 is bypassed.

Speech reconstruction from a combined bitstream containing MFCC and pitch information is known from the document Speech Reconstruction from Mel Frequency Cepstral Coefficients and Pitch Frequency, Chazan D., et al, in Proc. IEEE Int. Conf. on Acoustics, Speech and Signal Processing, ICASSP 2000 (also available on the Internet at the URL "http://www.haifa.il.ibm.com/projects/multimedia/recovc/"). Other reconstruction algorithms may be used, for example, as described in the above-referenced documents ETSI ES 202 211 V1.1.1 (2003-11) and ETSI ES 202 212 V1.1.1 (2003-11).

In brief, the reconstruction algorithm employs a sinusoidal model, in which a short-term speech signal is represented by a sum of sine waves. Frequencies, amplitudes and phases of its sine wave components characterize the short-term speech signal. Given the MFCC vector, the pitch frequency and the voicing decision, a set of sine wave frequencies is determined. Synthetic phases are then generated and assigned to them. The sine wave amplitudes are estimated according to the desired binned spectrum, calculated from the given MFCC vector. Finally, the short time Fourier transform is reconstructed and converted to a time domain signal by an overlap-add method.

Figure 4:
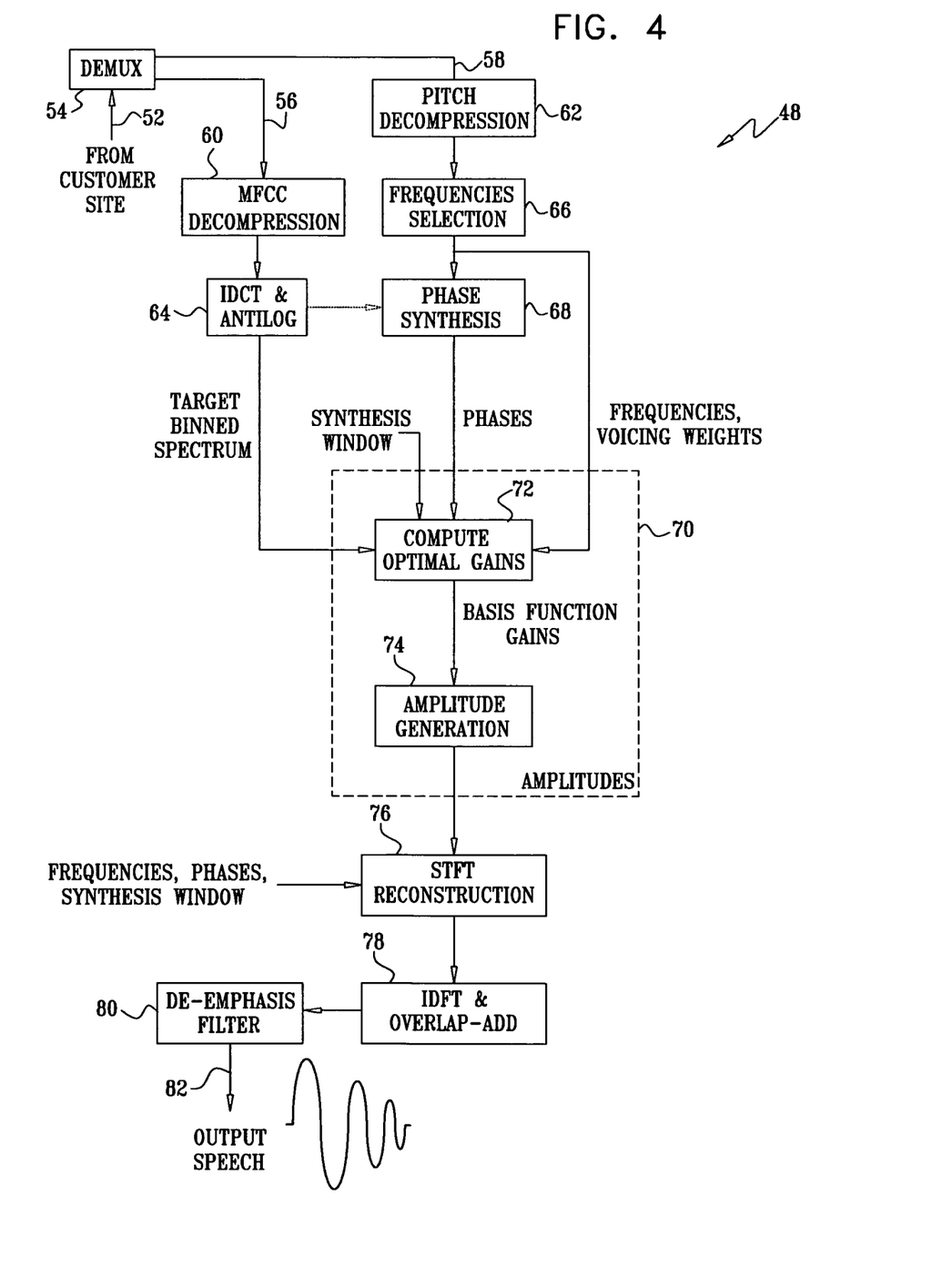
FIG. 4 is a detailed block diagram of the speech reconstruction tool shown in FIG. 3, in accordance with a disclosed embodiment of the invention.

Reference is now made to FIG. 4, which is a detailed block diagram of the reconstruction tool 48 (FIG. 3) in accordance with a disclosed embodiment of the invention. An input bitstream 52 has the same composition as the bitstream 46 (FIG. 2). The bitstream 52 is submitted to a demultiplexer 54 that produces a first output bitstream 56 containing compressed sequences of MFCC vectors, and a second output bitstream 58 containing compressed pitch and voicing information. The bitstream 56 and the bitstream 58 are decompressed in a MFCC decompression module 60 and a pitch data decompression module 62, respectively.

The output of the MFCC decompression module 60 enters a block 64, in which Mel-Cepstral-to-binned spectrum conversion occurs. This is the mathematical inversion of the log and DCT operations carried out in the front end 30 (FIG. 2) during the MFCC computation. If the number of Mel-Cepstral coefficients is smaller than the number of frequency bins, the MFCC vector is expanded by adding zero coefficients.

The sequence of pitch values obtained in the pitch data decompression module 62 enters a block 66 in which sine wave frequency and voicing weight selection occurs. Here a set of sine wave frequencies is selected according to the voicing decision and pitch frequency. Each sine wave component is assigned a voicing weight according to a predetermined template representing the voicing degree.

In a phase synthesis block 68, inputs are taken from the block 64 and the block 66. Sine wave phases corresponding to the sine wave frequencies are synthesized.

An amplitude generation section 70 receives input from the block 66 and the block 68. Here, in a model parameters estimation block 72, optimal gains are computed of predefined basis functions used for amplitude spectrum modeling. The optimal gains provide the best reconstruction of the target binned spectrum. Then sine wave amplitudes are calculated in a block 74 as linear combination of the basis functions with the optimal gains sampled at the sine wave frequencies.

The output of the section 70 is fed to a STFT reconstruction block 76. Here, frequencies, phases and amplitudes are combined to form a sine wave representation. The final reconstructed STFT is constructed from the sine waves by a convolution procedure.

The reconstructed STFT is converted to the time domain in a block 78. A windowed short-term signal is obtained by an IDFT and then overlap-added to the previous ST signal.

The time domain signal is next filtered in a de-emphasis filter 80, which inverts the effect of the pre-emphasis that was performed by the front end 30 (FIG. 1). In some embodiments of the front end 30, pre-emphasis is not performed, in which case the filter 80 can be omitted. In either case, a reconstructed speech output signal 82 is available for playback to a human listener at the support site 20.

Operation

Figure 5:
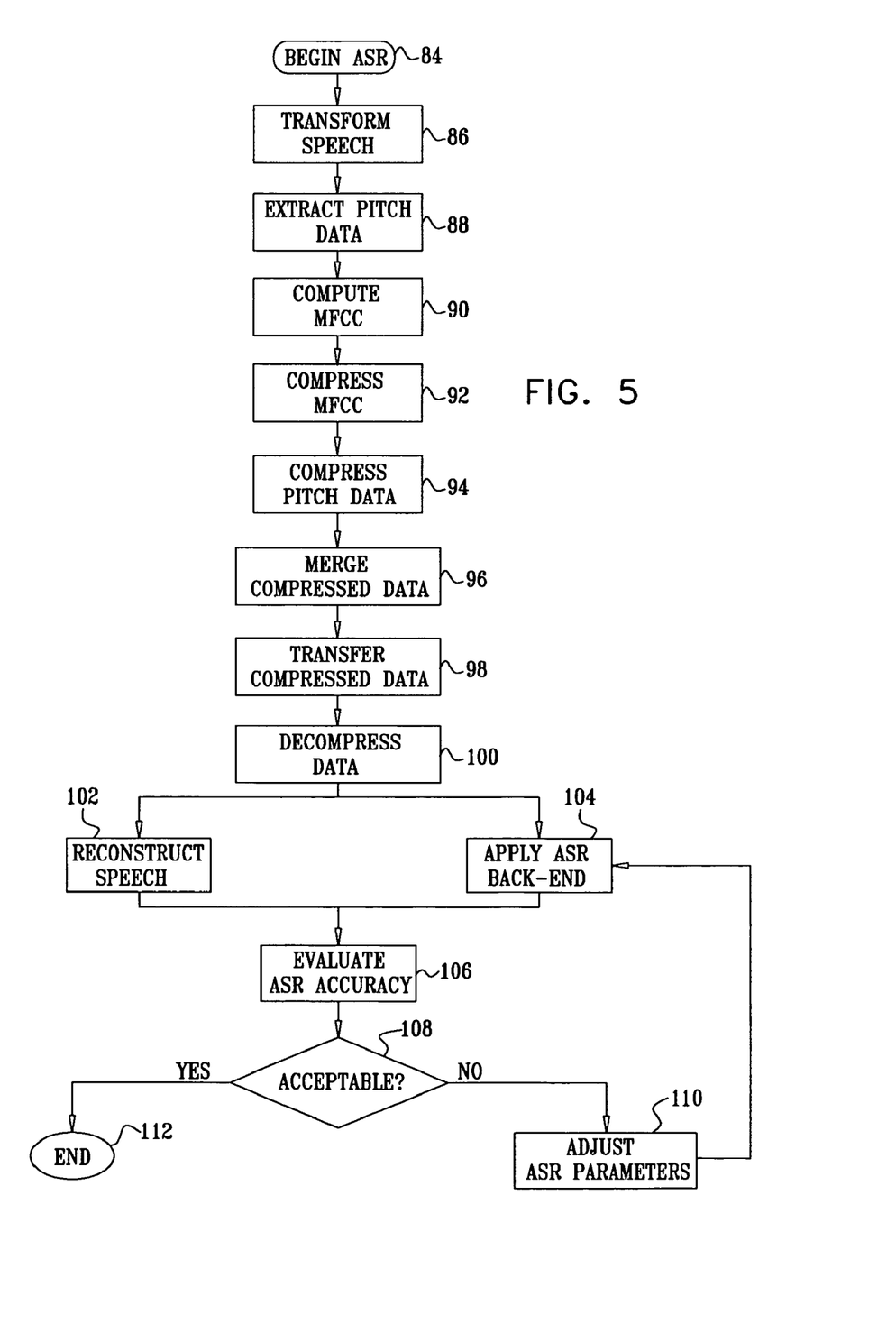
FIG. 5 is a flow chart illustrating a method of tuning and debugging an automatic speech recognition system in accordance with a disclosed embodiment of the invention.

Reference is now made to FIG. 5, which is a flow chart illustrating a method of tuning and debugging an automatic speech recognition system in accordance with a disclosed embodiment of the invention. The process steps are shown in a linear sequence for clarity of presentation. However, it will be evident from the discussion above that some of them can be performed in parallel, asynchronously, or in different orders.

At initial step 84 an automatic speech recognition system is initialized and set into operation using current parameters. Speech is received by the system as a time domain signal.

Next, at step 86, the time domain signal is converted to the frequency domain, and at step 88 pitch information is extracted from the frequency domain spectrum.

At step 90 MFCC coefficients are computed from the frequency domain spectrum developed in step 88. The MFCC data is then subjected to compression in step 92. The pitch information obtained in step 88 is compressed in step 94, as described above. Typically, the operations of step 92 and step 94 are performed simultaneously.

Next, at step 96, the compressed information obtained in step 92 and step 94 are multiplexed into a common output stream. Typically, the output stream is stored in a memory, before it is transferred, in step 98, to a remote support site. In some embodiments, the transfer occurs over a data network, for example the Internet. However, any suitable communications channel can be employed.

At the remote support site, the bitstream transferred from the customer site is demultiplexed and decompressed at step 100.

Next, at step 102 a speech signal is reconstructed from decompressed MFCC data and pitch information. Also, at step 104, decompressed MFCC data is fed to the back end of a second speech recognition engine, which is preferably identical to the back end of the recognition engine in the ASR system used in initial step 84, duplicating its current operating parameters. The front end of the second engine is entirely bypassed. It is to be emphasized that the result obtained in step 104 is very similar to the ASR result obtained in initial step 84 at the remote client site. As shown in FIG. 5, step 102 and step 104 are performed concurrently. This is not essential, however, and in some embodiments, they may be performed sequentially.

After completion of both step 102 and step 104 control passes to step 106. Here, human interaction is involved. The reconstructed speech (step 102) is played back to a human, interpreted by the human, and compared with the automatic transcript obtained at step 104. The ASR result obtained at step 104 is scored, using the human interpretation of the reconstructed speech as a standard. The more closely the ASR result conforms to the human interpretation, the better the score.

Control now proceeds to decision step 108, where, based on the evaluation of the ASR accuracy in step 106, it is determined if the ASR result produced by the recognition engine in step 104 is acceptable.

If the determination at decision step 108 is negative, then control proceeds to step 110. It is concluded that the parameters of the second speech recognition engine require adjustment. As a common use of the process is to evaluate problems with automatic speech recognition, parameter adjustment is frequently indicated. Necessary adjustments in the second speech recognition engine are made. Control then returns to step 104 to iterate the speech recognition process, using the new parameters. It will be noted that iteration of the speech recognition process does not alter the reconstructed speech, as step 102 is not repeated. ASR parameter adjustment may include operator assisted retraining or automatic, unsupervised retraining of acoustic models, automatic retraining of statistical language models and manual tuning of grammars and other parameters of the speech recognition engine. All the above-mentioned adjustment procedures are well known in the art. In embodiments in which either supervised acoustic model retraining or manual tuning of grammars and other parameters is applied, the recognition features along with human interpretation are employed in step 110. In embodiments in which unsupervised retraining of the acoustic model is employed, only the recognition features are used in the adjustment process. Statistical language model retraining requires only human interpretation of the reconstructed signals.

If the determination at decision step 108 is affirmative, then control proceeds to final step 112. Any adjustments made in the parameters of the second speech recognition engine in iterations of step 110 are communicated to the ASR system into the speech was input at initial step 84. Thus, the parameters of both speech recognition engines are conformed, and the process ends.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A computer-implemented method comprising the steps of:
   receiving audio input speech signals;
   extracting acoustic information comprising recognition features from said speech signals using a first automatic speech recognition system;
   compressing said acoustic information;
   transmitting said compressed acoustic information to a remote site;
   decompressing said compressed acoustic information to obtain decompressed recognition features;
   inputting, at said remote site, the decompressed recognition features into a second automatic speech recognition system to obtain a recognition result; and
   based at least in part on the recognition result, adjusting said first automatic speech recognition system.

2. The method according to claim 1, the method further comprising the steps of:
   at said remote site reconstructing said speech signals from said decompressed recognition features; and
   listening to said reconstructed speech signals by a human and obtaining a human interpretation thereof, wherein said step of evaluating comprises comparing an output of said second automatic speech recognition system with said human interpretation.

3. The method according to claim 2, wherein said step of extracting acoustic information includes extracting pitch information from said speech signals, and wherein said step of compressing said acoustic information includes compressing said pitch information to obtain compressed pitch data, and decompressing said compressed acoustic information further comprises decompressing said compressed pitch data to obtain decompressed pitch data, and wherein said step of reconstructing said speech signals is performed using said decompressed pitch data and said decompressed recognition features.

4. The method according to claim 3, further comprising the steps of:
   combining said compressed acoustic information and said compressed pitch data into a common output stream; and
   storing said output stream in a data repository, wherein said step of transmitting comprises reading said output stream from said data repository.

5. The method according to claim 3, wherein extracting pitch information comprises generating a fast Fourier transform of said speech signals.

6. The method according to claim 1, wherein said step of compressing said acoustic information comprises vector quantization.

7. The method according to claim 1, wherein said step of compressing said acoustic information comprises encoding Mel-frequency Cepstral coefficients.

8. The method according to claim 1, wherein adjusting said first automatic speech recognition system comprises accessing said first automatic speech recognition system from said remote site.

9. A computer software product including a computer-readable medium in which computer program instructions are stored, which instructions, when executed by at least one computer, cause the at least one computer to:
   receive audio input speech signals;
   extract features from said speech signals that are indicative of content of said speech signals;
   compress said features;
   transmit said compressed features to a remote site;
   responsively to a transmission of said compressed features, receive corrected parameters for an automatic speech recognition system from said remote site; and
   reconfigure said automatic speech recognition system with said corrected parameters.

10. The computer software product according to claim 9, wherein said instructions further cause said at least one computer to compress said features by vector quantization.

11. The computer software product according to claim 9, wherein said instructions further cause said at least one computer to extract pitch data from said speech signals, to compress said pitch data, and to transmit said compressed pitch data to said remote site.

12. The computer software product according to claim 11, wherein said instructions further cause said at least one computer to combine said compressed features and said compressed pitch data into a common output stream, to store said output stream in a data repository, thereafter to obtain a read-out of said output stream from said data repository and to transmit said compressed pitch data in said read-out to said remote site.

13. The computer software product according to claim 11, wherein said instructions cause said at least one computer to generate a fast Fourier transform of said speech signals in an extraction of said pitch data.

14. The computer software product according to claim 9, wherein said instructions cause said at least one computer to encode Mel-frequency Cepstral coefficients in an extraction of said features.

15. An automatic speech recognition system comprising at least one processor operative to:
   receive audio input speech signals;
   extract features from said speech signals that are indicative of content of said speech signals;
   extract pitch data from said speech signals;
   compress said features;
   compress said pitch data;
   transmit said compressed features and said compressed pitch data to a remote site;
   responsively to transmission of said compressed features, receive corrected parameters for said automatic speech recognition system from said remote site; and
   reconfigure said at least one processor with said corrected parameters.

16. The automatic speech recognition system according to claim 15, wherein said at least one processor is operative to compress said features by vector quantization.

17. The automatic speech recognition system according to claim 15, wherein said at least one processor is operative to combine said compressed features and said compressed pitch data into a common output stream and to store said output stream in a data repository, wherein said at least one processor is operative to obtain a read-out of said output stream from said data repository and to transmit said read-out to said remote site.

18. The automatic speech recognition system according to claim 15, wherein said at least one processor is operative to encode Mel-frequency Cepstral coefficients in an extraction of said features.

19. The automatic speech recognition system according to claim 15, wherein said at least one processor is operative to generate a fast Fourier transform of said speech signals in an extraction of said pitch data.

20. A system comprising:
a first site comprising at least one first processor programmed to receive compressed acoustic information extracted from speech signals using a first automatic speech recognition system and to decompress the compressed acoustic information to obtain decompressed recognition features; and
a second site, remote from the first site, comprising at least one second processor programmed to input the decompressed recognition features into a second automatic speech recognition system to obtain a recognition result, to determine corrected parameters for the first speech recognition system based, at least in part, on the recognition result, and to transmit the corrected parameters for the first automatic speech recognition system to the first site.

* * * * *